Figure 2:
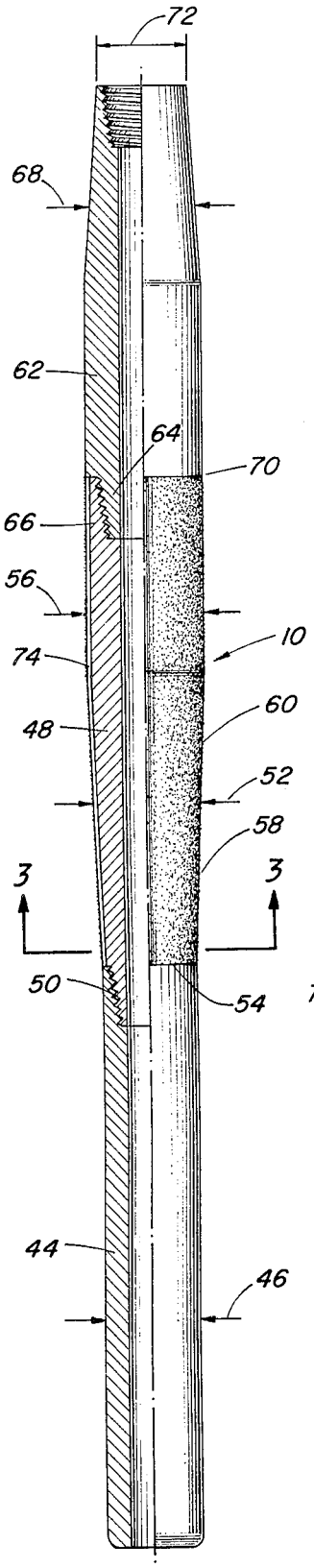
Figure 3:
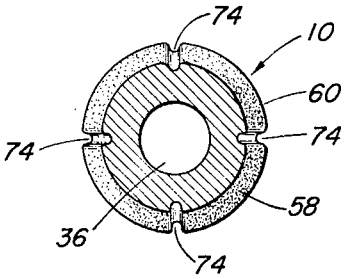
Figure 1:
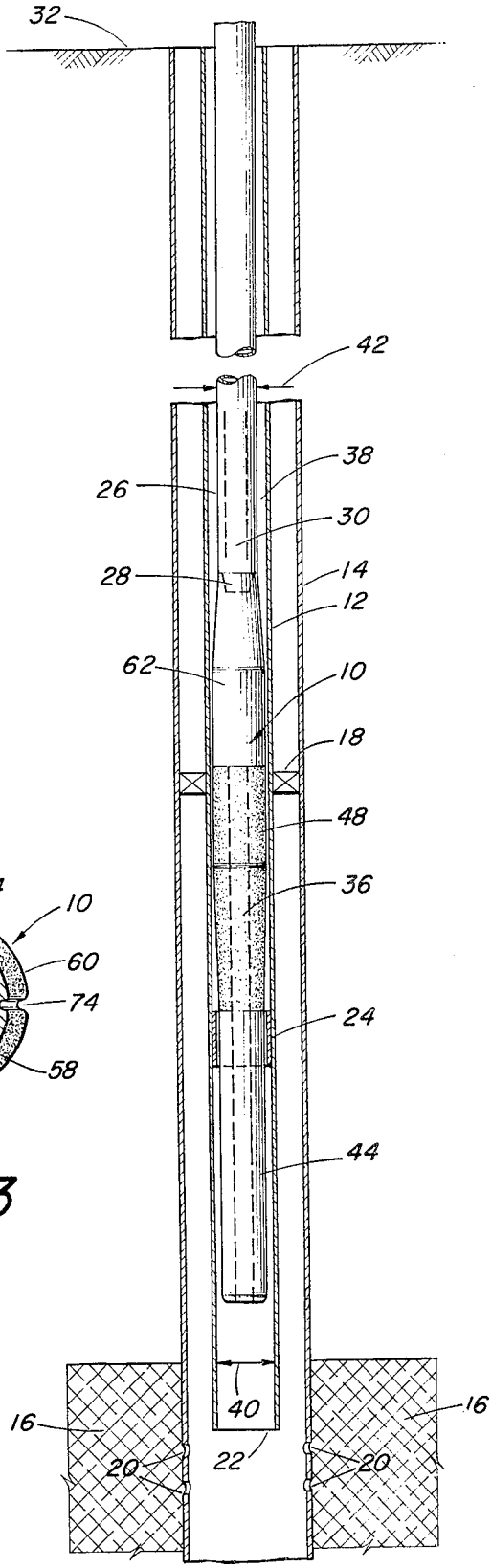

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED APRIL 6, 1976

945 O.G. 30

T945,007
STABILIZED PILOT MILL
Carl E. Lindberg, New Orleans, La., assignor to
Continental Oil Company, Ponca City, Okla.
Filed Feb. 5, 1975, Ser. No. 547,154
Int. Cl. E21b *29/00*
U.S. Cl. 166—298
1 Sheet Drawing. 12 Pages Specification

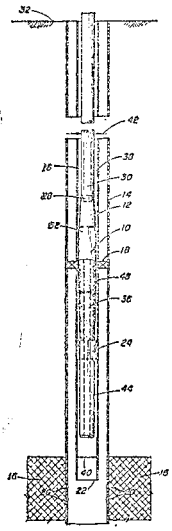

A stabilized pilot mill for increasing the diameter of a landing nipple in a tubing string, said pilot mill comprising: a tubular pilot section adapted to extend through the landing nipple and center the stabilized pilot mill in position; a tubular mill section joined to the pilot section and including an abrasive surface for abrasively removing the landing nipple when the pilot mill is rotated and a tubular stabilizing section joined to the other end of the mill section for further stabilizing the pilot mill during the removal of the landing nipple.

STABILIZED PILOT MILL

Original Filed Feb. 5, 1975